United States Patent [19]

Takahashi

[11] 4,246,610
[45] Jan. 20, 1981

[54] NOISE REDUCTION SYSTEM FOR COLOR TELEVISION SIGNAL

[75] Inventor: Hiroshi Takahashi, Tokyo, Japan

[73] Assignee: Nippon Electric Co., Ltd., Tokyo, Japan

[21] Appl. No.: 24,415

[22] Filed: Mar. 27, 1979

[30] Foreign Application Priority Data

Mar. 27, 1978 [JP] Japan .................................. 53-35805

[51] Int. Cl.³ ............................................. H04N 5/21
[52] U.S. Cl. ...................................... 358/167; 358/36
[58] Field of Search ................... 358/36, 136, 167, 166

[56] References Cited

U.S. PATENT DOCUMENTS 4,058,836  11/1977  Drewery et al. ..................... 358/167

OTHER PUBLICATIONS

McMann et al., "A Digital Noise Reducer for Encoded NTSC Signals", SMPTE Journal, vol. 87, Mar. 1978, pp. 129-133.

*Primary Examiner*—John C. Martin
*Attorney, Agent, or Firm*—Hopgood, Calimafde, Kalil, Blaustein & Lieberman

[57] ABSTRACT

A noise reduction system for a color television signal wherein the television video signal is stored for a period substantially equal to the period of one television frame and the value of the stored signal is compared to the value of a present incoming television signal to produce a frame-to-frame difference signal. A non-linear transmission factor, dependent on the value of the frame-to-frame difference signal, is introduced into said difference signal and the difference signal is then added to the present incoming television signal.

5 Claims, 6 Drawing Figures

NOISE REDUCTION SYSTEM FOR COLOR TELEVISION SIGNAL

FIELD OF THE INVENTION

This invention relates to a noise reduction system for improving the signal-to-noise (S/N) ratio of a color television video signal and, more particularly, to a system for improving the S/N ratio of a color television video signal by utilizing the inter-frame correlation of such a signal.

BACKGROUND OF THE INVENTION

Conventional noise reduction systems are disclosed, for example, in U.S. Pat. No. 4,064,530 entitled "NOISE REDUCTION SYSTEM FOR COLOR TELEVISION" issued to A. Kaiser et al. and in articles, "A Digital Noise Reducer for Encoded NTSC Signals" by R. H. McMann et al. and "Digital Techniques for Reducing Television Noise" by J. P. Rossi, published in the Journal of SMPTE, Vol. 87, March 1978 pages 129-133 and 134-140, respectively. In these disclosed systems, one to several frame portions of a video signal are recursively added to the present frame as long as there is a high inter-correlation, as for example in the case of a still object being shown. Such recursive addition serves to improve the S/N ratio. When the inter-frame correlation is relatively low, as in the case of a fast moving object being shown, either no addition is performed or fewer frame portions of the video signal are recursively added to the present frame. This is done to prevent the formation of an afterimage or lag that unavoidably accompanies recursive frame-to-frame addition for noise reduction.

Conventional noise reduction systems comprise a one-frame memory, two variable attenuators for attenuating the amplitudes of present and stored video signals, an adder for adding the stored video signal to the present video signal, and means for detecting motion between the present and stored frames to produce a frame-to-frame difference signal. The variable attenuators are ganged and introduce transmission factors $(1-k)$ and $k$ to the present and stored video signals, respectively, with the factor k being a function of the frame-to-frame difference signal. In practice, the variable attenuators must include plural sets of factors $(1-k)$ and $k$. This necessity results in complicated and expensive variable attenuators.

It is, therefore, an object of this invention to provide a simple and inexpensive noise reduction system having a simplified attenuator.

SUMMARY OF THE INVENTION

In accordance with the invention there is provided a noise reduction system for 7a color television video signal comprising:

memory means for storing said video signal for a period substantially equal to the period of one television frame to produce a stored video signal;

detector means for producing a frame-to-frame difference signal in response to relative motion between said stored video signal and a present incoming video signal;

non-linear means for introducing a non-linear transmission-factor to said frame-to-frame difference signal, said non-linear transmission-factor being dependent upon the level of said frame-to-frame difference signal; and means for adding said frame-to-frame difference signal, supplied from said non-linear means, to said present incoming video signal.

Other objects, features, construction and operation of this invention will be best understood from the following detailed description taken in conjunction with the accompanying drawings.

DETAILED DESCRIPTION

Figure 1:
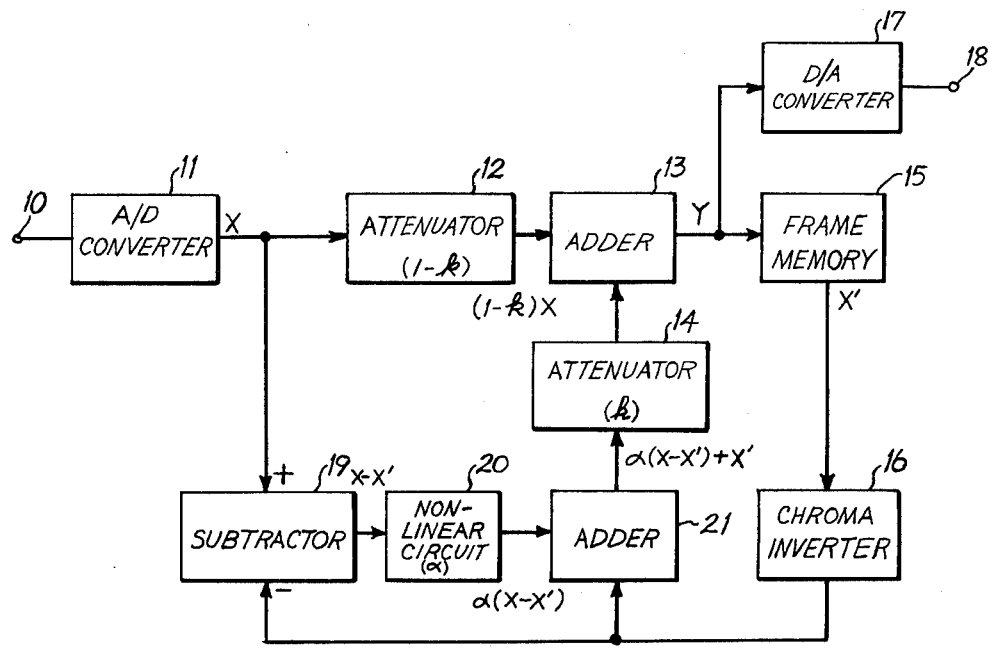
FIG. 1 is a block diagram of a first embodiment of the invention.

Referring to FIG. 1, a video signal from an input terminal 10 is converted at an analog to digital (A/D) converter 11 to an 8-bit PCM signal which is then supplied to a stationary attenuator 12 and multiplied by the factor $(1-k)$. The output from attenuator 12 is summed at adder 13 with the output from another stationary attenuator 14 and the summed supplied to frame memory signal is 15. Memory 15 has sufficient capacity to store one frame portion of the video signal. The output from frame memory 15 is passed through chroma inverter 16, and from there via adder 21 to stationary attenuator 14 which multiplies the input by the factor k and supplies the multiplied output to adder 13. The output from adder 13 is converted, at a digital to analog (D/A) converter 17, to an analog video signal which is supplied to output terminal 18. A subtracter 19 delivers a signal representative of the frame-to-frame difference between the incoming video signal, supplied from the A/D converter 11, and the stored video signal is supplied from chroma inverter 16. The frame-to-frame difference signal from subtracter 19 is supplied to a non-linear circuit 20 having a non-linear transmission factor $\alpha$. The frame-to-frame difference signal is passed through non-linear circuit 20 and is supplied to adder 21 where it is added to the stored video signal from chroma inverter 16. The output of adder 21 is supplied through attenuator 14 to adder 13.

Assuming that the levels of the present and stored video signals, from A/D converter 11 and frame memory 15, are represented by X and X', respectively, the output level Y of adder 13 is generally represented by equation (1).

$$Y = (1-k)x + k\{\alpha(X-X') + X'\} \tag{1}$$

Figure 2:
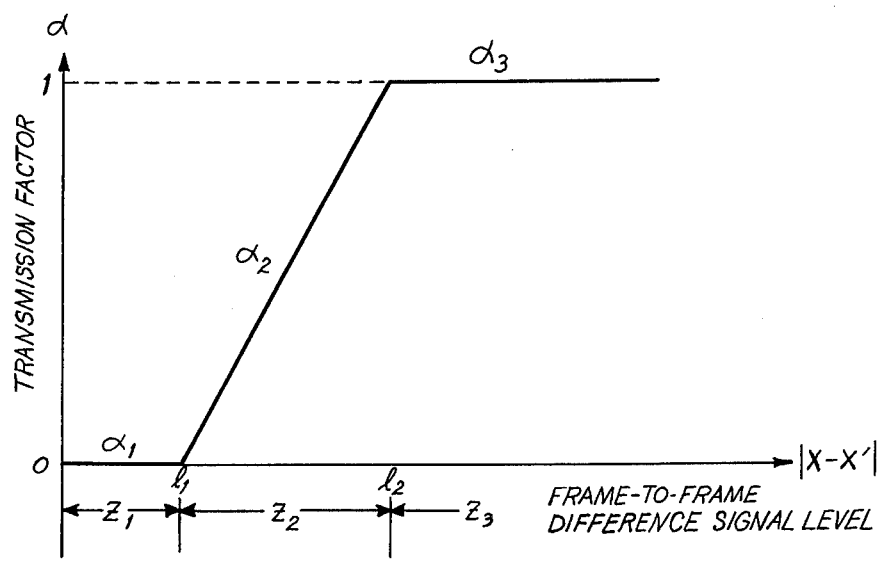
FIG. 2 illustrates characteristics of the non-linear circuit employed in the first embodiment of the invention shown in FIG. 1.

The non-linear transmission-factor $\alpha$ is shown in FIG. 2 where the abscissa represents the level of the frame-to-frame difference signal in absolute value, and the ordinate represents the transmission factor $\alpha$. The non-linear transmission-factor $\alpha$ has three different characteristics $\alpha_1$, $\alpha_2$ and $\alpha_3$ in accordance with three level-ranges $Z_1$, $Z_2$ and $Z_3$ of the frame-to-frame difference signal.

More particularly, for the first range $Z_1$ during which the level of the frame-to-frame difference signal is less than a first level $l_1$, i.e., the frame-to-frame difference signal includes only noise components, the transmission-factor $\alpha$ is held to zero, i.e., $\alpha_1 = 0$, whereby the frame-to-frame difference signal is not passed through non-linear circuit 20. Therefore, for the first range $Z_1$ where $\alpha_1 = 0$, the output level $Y_1$ is represented as follows:

$$Y_1 = (1-k)X + KX' \qquad (2)$$

In other words, for the first range $Z_1$, the system is operated as a recursive filter in which the transmission factor k is fixed, whereby the S/N ratio of the output signal is improved.

For the second range $Z_2$, the output level $Y_2$ is represented by equation (3), i.e., $$Y_2 = \{1 - k(1-\alpha_2)\}X + k(1-\alpha_2)X' \qquad (3)$$

In other words, for the second range $Z_2$, the system is also operated as a recursive filter in which the transmission factor $\alpha_2$, i.e., $k(1-\alpha_2)$ depends upon the level of the frame-to-frame difference signal. Therefore the degree of the improvement in the S/N ratio depends upon the relative motion between the present and the stored video signals.

For the third range $Z_3$, for which the level of the frame-to-frame difference signal is greater than a second level $l_2$, the transmission factor $\alpha$ is held to unity, i.e., $\alpha_3 = 1$, whereby the frame-to-frame difference signal is passed unchanged through the non-linear circuit 20. Therefore, for the third range $Z_3$ where $\alpha_3 = 1$, the output level $Y_3$ is respresended as follows:

$$Y_3 = (1-k)X + KX = X \qquad (4)$$

In other words, for the third range $Z_3$, the present video signal is presented to the output 3 without change.

The non-linear circuit 20 may be comprised of a read-only-memory (ROM) in which the frame-to-frame difference signal is applied as an address signal to thereby produce an output signal whose level is zero, $\alpha_2(X-X')$, and $X-X'$ for the first, second, and third ranges $Z_1$, $Z_2$ and $Z_3$, respectively. In this first embodiment, attenuators 12 and 14 are of a simplified construction as transmission factors $(1-k)$ and k are fixed.

Figure 3:
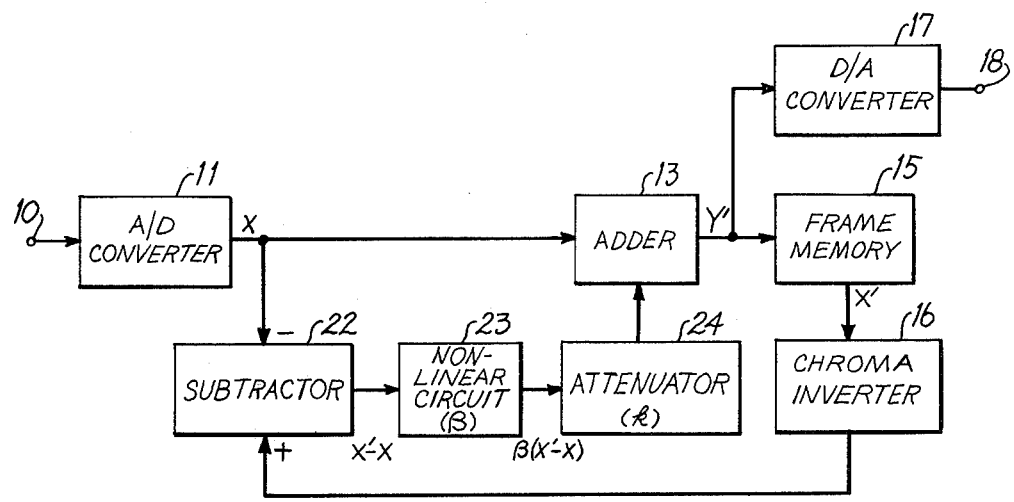
FIG. 3 is a block diagram of a second embodiment of the invention.

Referring to FIG. 3, a second embodiment of the invention comprises A/D converter 11, adder 13, frame memory 15, chroma inverter 16, and D/A converter 17, identical to those described in the first embodiment shown in FIG. 1. In this embodiment however the present video signal is directly supplied from A/D converter 11 to adder 13, i.e., the present video signal is supplied to the adder without being attenuated.

Figure 4:
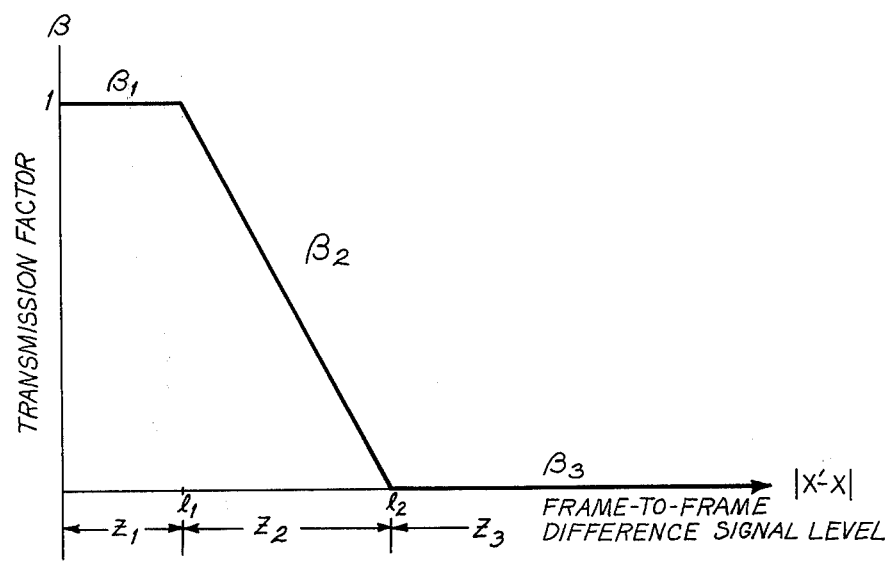
FIG. 4 illustrates characteristic of the non-linear circuit employed in the second embodiment of the invention shown in FIG. 3.

The second embodiment also comprises a subtractor 22 for subtracting the present video signal level X from the stored video signal level X' to produce the frame-to-frame difference signal $X'-X$. The difference signal $X'-X$ is supplied to a non-linear circuit 23 having a non-linear transmission-factor $\beta$. Transmission-factor $\beta$ has inverse characteristics to transmission factor $\alpha$ shown in FIG. 4. The non-linear transmission-factor $\beta$ has three different characteristics $\beta_1 = 1$, $\beta_2$ and $\beta_3 = 0$ for the ranges $Z_1$, $Z_2$, and $Z_3$, respectively. The output signal from non-linear circuit 23 is multiplied by the factor k at attenuator 24. The output from attenuator 24 is added, at adder 13, to the present video signal supplied directly from A/D converter 11. The output from converter 11 is supplied to frame memory 15.

The output level $Y'$ in the second embodiment is generally represented as follows:

$$Y' = X + \beta k(X' - X) \qquad (5)$$

For the first, second and third ranges $Z_1$, $Z_2$ and $Z_3$ where $\beta_1 = 1$, $\beta_2$, and $\beta_3 = 0$, the output levels $Y_1'$, $Y_2'$ and $Y_3'$ are respectively represented as follows:

$$Y_1' = (1-k)X + kX', \qquad (6)$$

$$Y_2' = (1-\beta_2 k)X + \beta_2 kX', \text{ and} \qquad (7)$$

$$Y_3' = X \qquad (8)$$

As is apparent from equations (6), (7), and (8), the system of the second embodiment is operated as a recursive filter to thereby improve the S/N ratio for the first and second ranges $Z_1$, and $Z_2$. For the third range $Z_3$, the present video signal is sent out without change.

Figure 5:
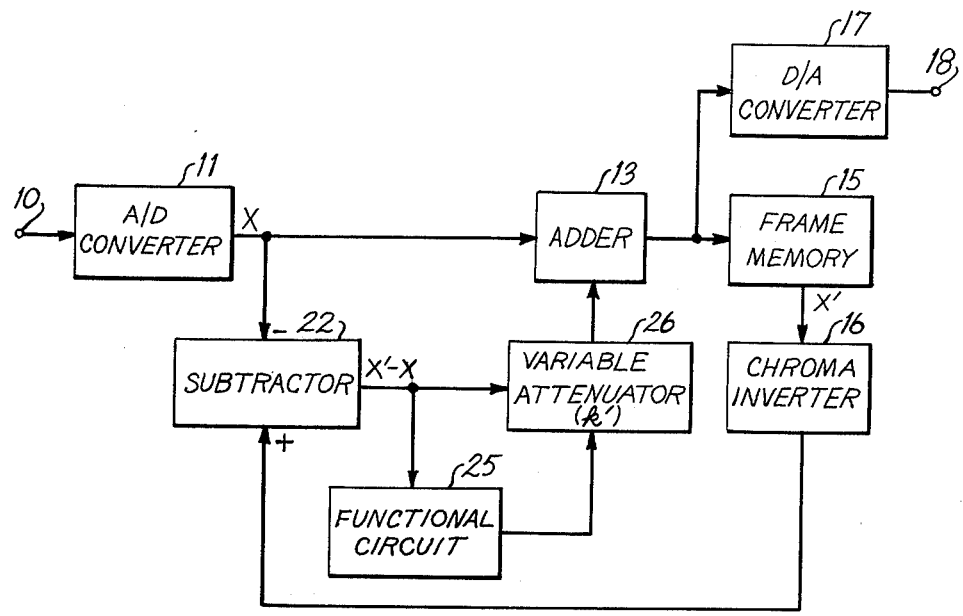
FIG. 5 is a block diagram of a third embodiment of the invention.

Referring to FIG. 5, a third embodiment of the invention is identical to the second embodiment except that, instead of non-linear circuit 23 and stationary attenuator 24, a functional circuit 25 and a variable attenuator 26 are provided for producing the signal $\beta k(X'-X)$ from the difference signal $X'-X$. Variable attenuator 26 has a variable transmission factor $k'(=\beta k)$, which is controlled by the output of the functional circuit 25 such that variable factor $k'$ is equal to k, $\beta_2 k$, and 0 for the ranges $Z_1$, $Z_2$, and $Z_3$, respectively.

In the second and third embodiments, for the third range $Z_3$, where the difference signal level $X'-X$ is greater than the level $l_2$ the transmission factor $\beta_3$ is maintained at zero whereby the difference signal is not attenuated. This makes it possible to narrow the dynamic range for the signal path from subtracter 22 to adder 13. This is significant in digital processing as the number of bits needed for attenuator 24 may be reduced.

As described in the copending U.S. Patent application having Ser. No. 018,474, filed Mar. 8, 1979 and entitled "Noise Reduction System for a Color Television Signal", how offensive noise is, to the eyes of a viewer, in a displayed television picture, depends on the level of the input video signal. If the displayed object is bright enough to make the level of the incoming video signal sufficiently high, noise is not recognized. It is also known that most noise components are in the higher frequency regions of a television video signal and that they cause interferences in the chrominance component of video signals.

Figure 6:
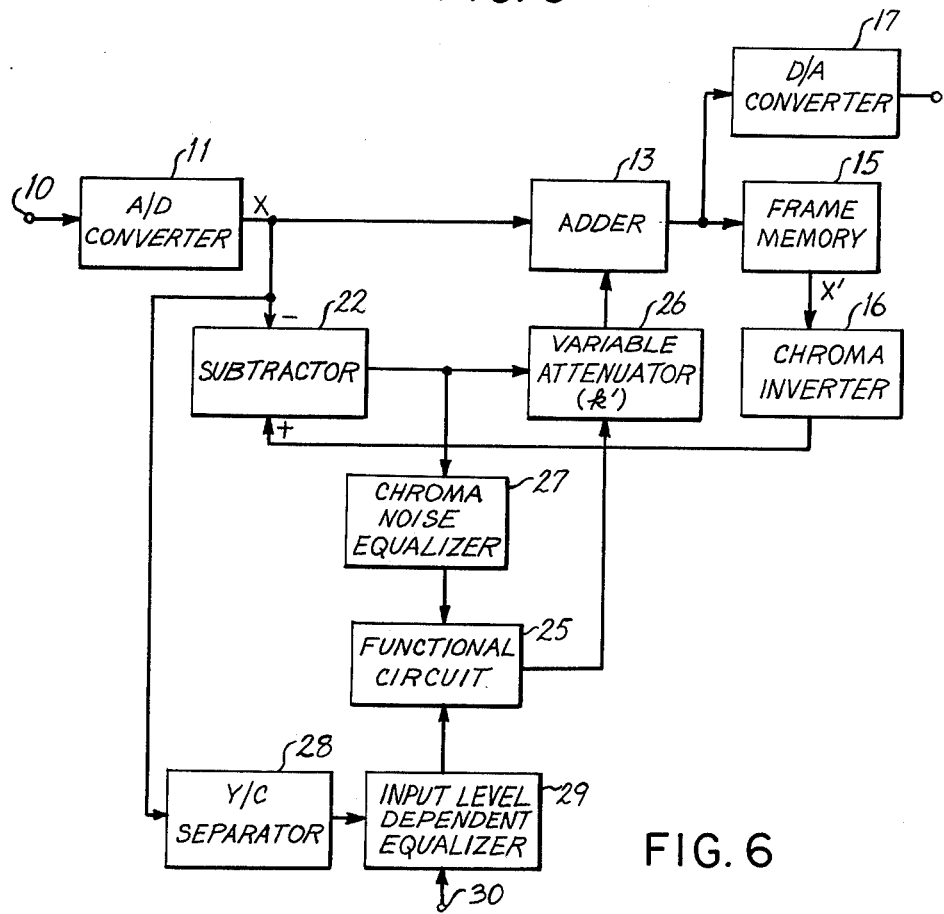
FIG. 6 is a block diagram of a fourth embodiment of the invention.

Based on these facts, a fourth embodiment shown in FIG. 6 further comprises, in comparison with the third embodiment shown in FIG. 5, a chroma noise equalizer 27, a luminance/chrominance (Y/C) separator 28, and an input level dependent equalizer 29 identical to circuits 9, 11, and 12 shown in FIG. 1 of copending application Ser. No. 018,474. The frame-to-frame difference signal is passed through chroma noise equalizer 27 which is comprised of a low pass filter. Since most noise components, contained in an input video signal, are in the high frequency region, it is particularly necessary to emphasize the degree of noise reduction in the higher frequency region rather than in the lower frequency region. The frame-to-frame difference signal from the subtracter 22 has its high frequency component eliminated by chroma noise equalizer 27 before it is supplied to functional circuit 25. Thus, the noise reduction effect is emphasized only in the high frequency region to minimize noise-induced interference such as cross talk and cross color in the chrominance component. Noise reduction is not emphasized for video signals in the low frequency region and therefore undersired effects such as lag are not produced.

The output from A/D converter 11 has the luminance component separated from the chrominance component in the luminance/chrominance (Y/C) separator 28 and is supplied to the input level dependent equalizer 29 as information representative of the input video signal level. Equalizer 29 is comprised of a read-only memory (ROM), which stores an equalized reference determined by the level of the input video signal, supplied from Y/C separator 28, and a predetermined reference supplied from terminal 30.

Although specific embodiments of this invention have been shown and described it will be understood that various modifications may be made without separating from the spirit of this invention.

What is claimed is:

1. A noise reduction system for reducing noise contained in a television video signal, said system comprising:
    memory means for storing said video signal for a period substantially equal to the period of one television frame to produce a stored video signal;
    detector means for producing a frame-to-frame difference signal in response to relative motion between said stored video signal and a present incoming video signal, said detector means including means for subtracting said present incoming video signal from said stored video signal;
    non-linear means for introducing a non-linear transmission-factor to said frame-to-frame difference signal, said non-linear transmission-factor being dependent upon the level of said frame-to-frame difference signal; said non-linear transmission factor for a low level frame-to-frame difference signal being greater than said non-linear transmission factor for a high level frame-to-frame difference signal; and
    means for adding said frame-to-frame difference signal supplied from said non-linear means to said present incoming video signal.

2. A noise reduction system in accordance with claim 1, wherein said non-linear transmission factor is equal to a first fixed value at the time said frame-to-frame difference signal level is less than a first amount, said non-linear transmission factor varying in response to changes in said frame-to-frame difference signal level at the time said frame-to-frame difference signal level is greater than said first amount but less than a second amount and said non-linear transmission factor being equal to a second fixed value at the time said frame-to-frame difference signal level is greater than said second amount.

3. A noise reduction system in accordance with claim 2, wherein there is further included means for converting successive ones of said video signals into digital signals, means for storing a first one of said digital signals in said memory means for said period and means included in said detector means for subtracting the value of said first one of said digital signals from the value of a second and successive one of said digital signals and for producing said frame-to-frame difference signal in response to said value subtraction.

4. A noise reduction system for reducing noise contained in a television video signal, said system comprising:
    memory means for storing said video signal for a period substantially equal to the period of one television frame to produce a stored video signal;
    detector means for producing a frame-to-frame difference signal in response to relative motion between said stored video signal and a present incoming video signal;
    non-linear means for introducing a non-linear transmission-factor to said frame-to-frame difference signal, said non-linear transmission-factor being dependent upon the level of said frame-to-frame difference signal; and
    means for adding said frame-to-frame difference signal supplied from said non-linear means to said present incoming video signal, said adding means including means for adding said stored video signal to said frame-to-frame difference signal, means for attenuating the sum of said stored video signal and said frame-to-frame difference signal to produce an attenuated sum signal and means for adding said attenuated sum signal to said present incoming video signal.

5. A noise reduction system in accordance with claim 4, further including means for attenuating said present incoming video signal prior to adding said present incoming video signal to said attenuated sum signal.

* * * * *